US012597591B2

(12) United States Patent
Akira et al.

(10) Patent No.: US 12,597,591 B2
(45) Date of Patent: Apr. 7, 2026

(54) ELECTRODE FOR SECONDARY BATTERIES, AND SECONDARY BATTERY

(71) Applicant: SANYO Electric Co., Ltd., Kadoma (JP)

(72) Inventors: Tatsuya Akira, Osaka (JP); Junichi Sugaya, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 788 days.

(21) Appl. No.: 17/785,633

(22) PCT Filed: Dec. 21, 2020

(86) PCT No.: PCT/JP2020/047584
§ 371 (c)(1),
(2) Date: Jun. 15, 2022

(87) PCT Pub. No.: WO2021/132115
PCT Pub. Date: Jul. 1, 2021

(65) Prior Publication Data
US 2023/0064681 A1 Mar. 2, 2023

(30) Foreign Application Priority Data

Dec. 25, 2019 (JP) ................................. 2019-233706

(51) Int. Cl.
*H01M 4/10* (2006.01)
*H01M 4/36* (2006.01)
*H01M 10/0587* (2010.01)

(52) U.S. Cl.
CPC ............. *H01M 4/10* (2013.01); *H01M 4/366* (2013.01); *H01M 10/0587* (2013.01)

(58) Field of Classification Search
CPC ..... H01M 4/10; H01M 4/366; H01M 10/0587
See application file for complete search history.

(56) References Cited

U.S. PATENT DOCUMENTS

| | | |
|---|---|---|
| 6,314,638 B1 | 11/2001 | Kaido et al. |
| 2001/0012588 A1 | 8/2001 | Kaido et al. |

(Continued)

FOREIGN PATENT DOCUMENTS

| | | |
|---|---|---|
| CN | 108511787 A | 9/2018 |
| JP | 10-12220 A | 1/1998 |

(Continued)

OTHER PUBLICATIONS

International Search Report dated Feb. 22, 2021, issued in counterpart International Application No. PCT/JP2020/047584 (2 pages).

(Continued)

*Primary Examiner* — Olatunji A Godo
(74) *Attorney, Agent, or Firm* — WHDA, LLP

(57) ABSTRACT

The purpose of the present disclosure is to improve the cycle characteristics of a secondary battery. An electrode for secondary batteries according to one example of the embodiments of the present disclosure is provided with a core body and a mixture layer that is formed on the surface of the core body. The mixture layer comprises a plurality of high-density regions and a plurality of low-density regions; and the high-density regions and the low-density regions are alternately arranged in a first direction of the mixture layer, while extending in a second direction that is perpendicular to the first direction, thereby forming stripes. It is preferable that there are three or more high-density regions and three or more low-density regions.

4 Claims, 3 Drawing Sheets

(56) References Cited

U.S. PATENT DOCUMENTS

| | | | | |
|---|---|---|---|---|
| 2003/0044667 A1* | 3/2003 | Hara | .................. | H01M 4/8657 |
| | | | | 429/495 |
| 2006/0006063 A1 | 1/2006 | Tanaka et al. | | |
| 2018/0226640 A1* | 8/2018 | Choi | ....................... | B01J 13/04 |
| 2018/0241043 A1 | 8/2018 | Miyatake et al. | | |
| 2019/0148695 A1* | 5/2019 | Ramasubramanian | .................... | |
| | | | | H01M 50/44 |
| | | | | 429/246 |

FOREIGN PATENT DOCUMENTS

| | | |
|---|---|---|
| JP | 2002-298922 A | 10/2002 |
| JP | 2006-24710 A | 1/2006 |
| JP | 2018-137187 A | 8/2018 |

OTHER PUBLICATIONS

Office Action dated Oct. 18, 2023, issued in the counterpart Chinese Application No. 202080086943.4. (5 pgs.).

\* cited by examiner

ELECTRODE FOR SECONDARY BATTERIES, AND SECONDARY BATTERY

CROSS-REFERENCE TO RELATED APPLICATION

This application is a National Phase Application filed under 35 U.S.C. § 371 of International Application No. PCT/JP2020/047584 filed on Dec. 21, 2020 which claims the benefit of priority under 35 U.S.C. §119(a) of Japanese Patent Application No. 2019-233706 filed in Japan on Dec. 25, 2019, the contents of which are incorporated herein by reference.

TECHNICAL FIELD

The present disclosure relates to an electrode for a secondary battery and a secondary battery comprising the electrode.

BACKGROUND ART

Electrodes for secondary batteries, such as lithium ion batteries, each comprise a core of metal foil or the like and a mixture layer formed on the surface of the core. In general, the density of the mixture layer is uniform over the entire layer, however, a mixture layer having a high density portion and a low density portion has also been proposed.

For example, Patent Literature 1 discloses a method for producing an electrode, wherein while arranging uncoated portions without a mixture slurry at predetermined intervals in the longitudinal direction of a long core, coating portions to be coated between the uncoated portions with the slurry so that an amount of the slurry coated per unit area continuously decreases or increases. According to this method, a mixture layer in which a high density region and a low density region along the longitudinal direction of the electrode are present, is formed. Moreover, Patent Literature 2 discloses a secondary battery comprising a mixture layer in which low density portions having low filling densities of active materials are dottedly present.

CITATION LIST

Patent Literature

PATENT LITERATURE 1: Japanese Unexamined Patent Application Publication No. Hei10-12220
PATENT LITERATURE 2: Japanese Unexamined Patent Application Publication No. 2002-298922

SUMMARY

Technical Problem

Now then, from the viewpoint of improving cycle characteristics of batteries, it is an important challenge to improve permeability of an electrolyte solution into an electrode assembly, allowing the electrolyte solution to evenly impregnate into the entire electrode assembly. The techniques disclosed in Patent Literatures 1 and 2 are expected to contribute to improvement of the cycle characteristics, however there is still room for improvement.

An object of the present disclosure is to provide an electrode for a secondary battery to improve cycle characteristics of the secondary battery.

Solution to Problem

The electrode for a secondary battery according to the present disclosure is an electrode for a secondary battery comprising a core and a mixture layer formed on a surface of the core, and is characterized in that the mixture layer includes a plurality of high density regions and a plurality of low density regions, the high density regions and the low density regions being alternately arranged in a first direction of the mixture layer, extending in a second direction perpendicular to the first direction, and being formed in a stripe shape.

The secondary battery according to the present disclosure comprises an electrode assembly including the aforementioned electrode for a secondary battery and an outer body housing the electrode assembly.

Advantageous Effect of Invention

According to the electrode for a secondary battery of the present disclosure, cycle characteristics of the battery can be improved. When the variation in an amount of electrolyte solution in an electrode assembly is large, a battery reaction unevenly proceeds, causing deterioration of battery performance, however, according to the electrode of the present disclosure, permeability of the electrolyte solution into the electrode assembly is conjectured to be improved, thereby improving the cycle: characteristics of the battery.

DESCRIPTION OF EMBODIMENTS

Hereinafter, an example of embodiments of the electrode for a secondary battery according to the present disclosure and the secondary battery comprising the electrode will be described in detail. In the following, a cylindrical battery in which a wound electrode assembly 14 is housed in a bottomed cylindrical outer can 16 is illustrated, but an outer body is not limited to the cylindrical outer can, and may be, for example, a square outer can or an outer body composed of a laminated sheet including a metal layer and a resin layer. Moreover, the electrode assembly may be a stacked electrode assembly in which a plurality of positive electrodes and a plurality of negative electrodes are alternately stacked with separators sandwiched therebetween.

Figure 1:
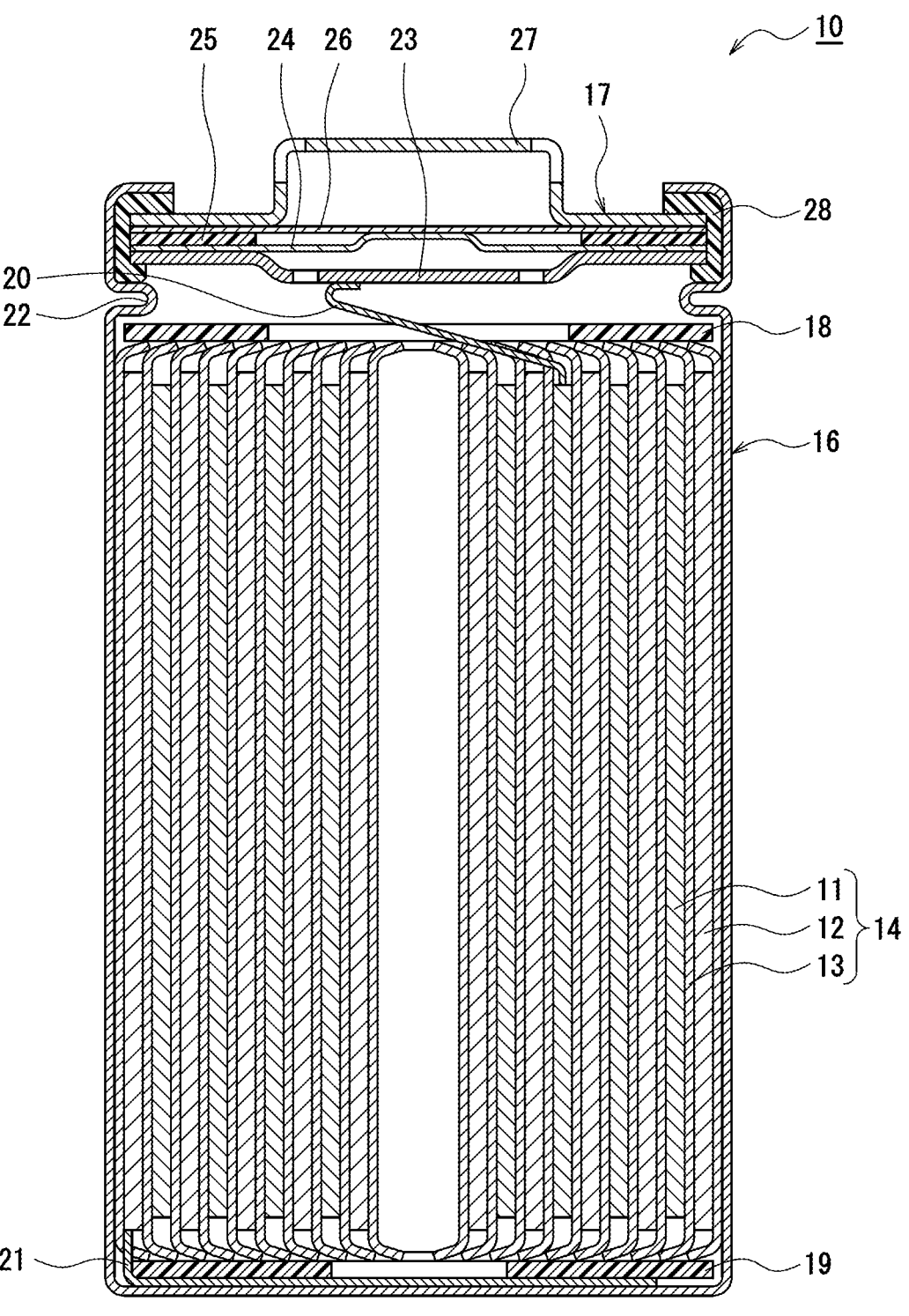
FIG. 1 is a sectional view of a secondary battery that is an example of an embodiment.

FIG. 1 is a sectional view of a secondary battery 10 that is an example of an embodiment. As illustrated in FIG. 1, the secondary battery 10 comprises a wound electrode assembly 14, an electrolyte solution, and an outer can 16 for housing the electrode assembly 14 and the electrolyte solution. The electrode assembly 14 has a positive electrode 11, a negative electrode 12, and a separator 13, and has a wound structure in which the positive electrode 11 and the negative electrode 12 are spirally wound via the separator 13. The outer can 16 is a bottomed cylindrical metal container having an opening on one side in the axial direction, and the opening of the outer can 16 is clogged by a sealing assembly 17. In the following, for convenience of explanation, the battery on the sealing assembly 17 side is an upper side and on the bottom side of the outer can 16 is a lower side.

The electrolyte solution may be an aqueous electrolyte solution, but is preferably a non-aqueous electrolyte solution. The non-aqueous electrolyte solution includes a non-aqueous solvent and an electrolyte salt dissolved in the non-aqueous solvent. As the non, aqueous solvent, for example, esters, ethers, nitriles, amides, and a mixed solvent of two or more of these are used. The non-aqueous solvent may contain a halogen substituent which substitutes at least a portion of hydrogen in these solvents with a halogen atom such as fluorine. As the electrolyte salt, for example, a lithium salt such as $LiPF_6$ is used. The electrolyte solution is not limited to the liquid electrolyte solution and may be a solid electrolyte solution using a gel polymer or the like.

The positive electrode 11, the negative electrode 12, and the separator 13, constituting the electrode assembly 14 are all belt-shaped long bodies and are alternately stacked in the radial direction of the electrode assembly 14 by being wound in a spiral shape. The negative electrode 12 is formed so as to have one size larger than the positive electrode 11 in order to prevent precipitation of lithium. Namely, the negative electrode 12 is formed longer than the positive electrode 11 in the longitudinal direction and the width direction (shorter direction). Two separators 13 are formed one size larger than at least the positive electrode 11 and are arranged so as to sandwich the positive electrode 11, for example. The electrode assembly 14 has a positive electrode lead 20 connected to the positive electrode 11 by welding or the like, and a negative electrode lead 21 connected to the negative electrode 12 by welding or the like.

Insulating plates 18 and 19 are arranged above and below the electrode assembly 14, respectively. In the example shown in FIG. 1, the positive electrode lead 20 extends to the sealing assembly 17 side through a through hole of the insulating plate 18, and the negative electrode lead 21 extends to the bottom side of the outer can 16 through the outside of the insulating plate 19. The positive electrode lead 20 is connected to the lower surface of an internal terminal plate 23 of the sealing assembly 17 by welding or the like, and a cap 27 that is a top plate of the sealing assembly 17 electrically connected to the internal terminal plate 23, serves as a positive electrode terminal. The negative electrode lead 21 is connected to the inner surface of the bottom of the outer can 16 by welding or the like, and the outer can 16 serves as a negative electrode terminal.

A gasket 28 is arranged between the outer can 16 and the sealing assembly 17 to secure airtightness inside the battery. The outer can 16 has a grooved portion 22 that partially projects inward on the side surface of the outer can 16 and that supports the sealing assembly 17. The grooved portion 22 is preferably formed in an annular shape along the circumferential direction of the outer can 16 and supports the sealing assembly 17 on the upper surface thereof. The sealing assembly 17 is fixed to the upper part of the outer can 16 by the grooved portion 22 and an opening end portion of the outer can 16 crimped for the sealing assembly 17.

The sealing assembly 17 has a structure in which the internal terminal plate 23, a lower vent member 24, an insulating member 25, an upper vent member 26, and the cap 27 are stacked in this order from the electrode assembly 14 side. Each member constituting the sealing assembly 17 has, for example, a disk shape or a ring shape, and each member except the insulating member 25 is electrically connected to one another. The lower vent member 24 and the upper vent member 26 are connected at their respective central portions, and the insulating member 25 is interposed between the respective peripheral portions. When the internal pressure of the battery rises due to abnormal heat generation, the lower vent member 24 deforms and breaks so as to push the upper vent member 26 toward the cap 27 side, so that the current path between the lower vent member 24 and the upper vent member 26 is blocked. When the internal pressure further rises, the upper vent member 26 breaks and a gas is discharged from the opening of the cap 27.

Hereinafter, the positive electrode 11, the negative electrode 12, and the separator 13 constituting the electrode assembly 14 will be described in detail.

[Positive Electrode]

The positive electrode 11 has a positive electrode core and a positive electrode mixture layer arranged on the surface of the positive electrode core. As the positive electrode core, a metal foil stable in the potential range of the positive electrode 11, such as aluminum or an aluminum alloy, a film in which the metal is arranged on the surface layer, etc., can be used. The positive electrode mixture layer includes a positive-electrode active material, a conductive agent, and a binder, and is preferably arranged on both sides of the positive electrode core. The positive electrode 11 can be fabricated, for example, by coating the positive electrode core with a positive electrode mixture slurry including the positive-electrode active material, the conductive agent, the binder, etc., drying the coated film, and then compressing it to form positive electrode mixture layers on both sides of the positive electrode core.

In the positive-electrode active material, a lithium transition metal composite oxide is used. Examples of the metal elements contained in the lithium transition metal composite oxide include Ni, Co, Mn, Al, B, Mg, Ti, V, Cr, Fe, Cu, Zn, Ga, Sr, Zr, Nb, In, Sn, Ta, W, etc. Among them, the metal element preferably contains at least one of Ni, Co, and Mn. Examples of suitable composite oxide include a lithium transition metal composite oxide containing Ni, Co and Mn and a lithium transition metal composite oxide containing Ni, Co and Al.

As the conductive agent included in the positive electrode mixture layer, a carbon material such as carbon black, acetylene black, Ketjen black, or graphite can be exemplified. As the binder included in the positive electrode mixture layer, a fluororesin such as polytetrafluoroethylene (PTFE) or polyvinylidene difluoride (PVdF), polyacrylonitrile (PAN), a polyimide resin, an acrylic resin, or a polyolefin resin can be exemplified. Moreover, these resins may be combined for use with cellulose derivatives such as carboxymethyl cellulose (CMC) or salts thereof, polyethylene oxide (PEO), etc.

[Negative Electrode]

The negative electrode 12 has a negative electrode core 30 and a negative electrode mixture layer 31 arranged on the surface of the negative electrode core 30 (see, FIG. 2 described below). As the negative electrode core 30, a metal foil stable in the potential range of the negative electrode 12 such as copper, a film in which the metal is arranged on the surface layer, etc., can be used. The negative electrode mixture layer 31 includes negative-electrode active material and a binder, and is preferably arranged, for example, on both sides of the negative electrode core 30 excluding the portions to which negative electrode leads 21 are connected. The negative electrode 12 can be fabricated, for example, by coating both surfaces of the negative electrode core 30 with a negative electrode mixture slurry including the negative-electrode active material, the binder, etc., drying the coated film, and then compressing it to form the negative electrode mixture layers 31 on both sides of the negative electrode core 30.

In the negative electrode mixture layer 31, for example, a carbon-based active material, which reversibly intercalates and releases a lithium ion, is included as the negative-electrode active material. Examples of the suitable carbon-based active materials include graphite of natural graphite such as scaly graphite, massive graphite, and earthy graphite, and artificial graphite such as massive artificial graphite (MAG), and graphitized mesophase carbon microbeads (MCMB). Moreover, a Si-based active material composed of at least one of Si and a Si-containing compound may be used for the negative-electrode active material, and the carbon-based active material and the Si-based active material may also be combined for use.

Examples of the Si-based material include a composite having a structure in which Si particles are dispersed in a silicon oxide phase (SiO), and a composite having a structure in which Si particles are dispersed in in a lithium silicate phase (LSX). A suitable SiO has a sea-island structure in which fine Si particles are substantially uniformly dispersed in an amorphous silicon oxide matrix and is represented by the general formula $SiO_x$ ($0.5 \leq x \leq 1.6$). A suitable LSX has a sea-island structure in which fine Si particles are substantially uniformly dispersed in a lithium silicate matrix and is represented by the general formula $Li_{2z}SiO_{(2+z)}$ ($0 < z < 2$).

As the binder included in the negative electrode mixture layer 31, a fluororesin, PAN, a polyimide resin, an acrylic resin, a polyolefin resin, or the like can also be used as in the case of the positive electrode 11, however, styrene-butadiene rubber (SBR) is preferably used. Further, the negative electrode mixture layer 31 preferably further includes CMC or a salt thereof, a polyacrylic acid (PAA) or a salt thereof, polyvinyl alcohol (PVA), or the like. Among them, SBR and CMC or a salt thereof, PAA or a salt thereof are suitably combined for use.

[Separator]

A porous sheet having ion permeability and insulating property is used for the separator 13. Specific examples of the porous sheet include a microporous thin film a woven fabric, and a nonwoven fabric. As materials for the separator 13, polyolefins such as polyethylene and polypropylene, cellulose, and the like are suitably used. The separator 13 may have either a single-layer structure or a multilayer structure. A heat-resistant layer or the like may be formed on the surface of the separator.

Hereinafter, the mixture layer of the electrode will be further describes in detail with reference to FIG. 2 and FIG. 3. FIG. 2 is a perspective view of the negative electrode 12. FIG. 3 is a modified example of the negative electrode 12. The configuration of the mixture layer will be described below by taking the negative electrode 12 as an example, however, the configuration described below can also be applied to the mixture layer of the positive electrode 11.

Figure 2:
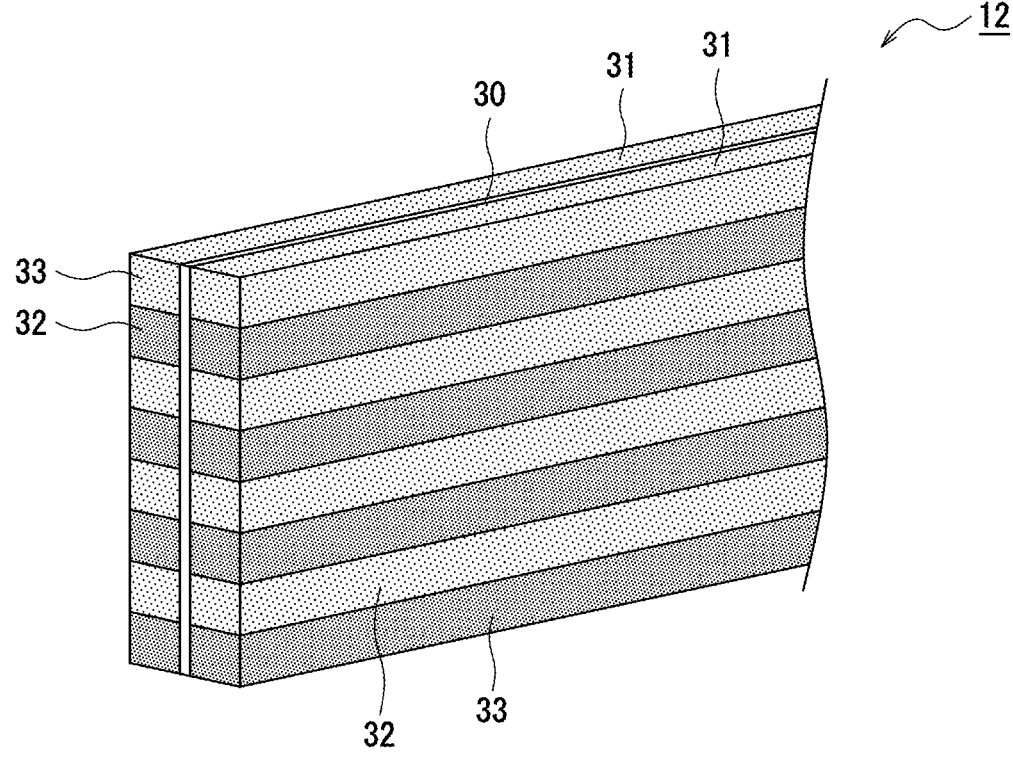
FIG. 2 is a perspective view of a negative electrode that is an example of an embodiment.
Figure 3:
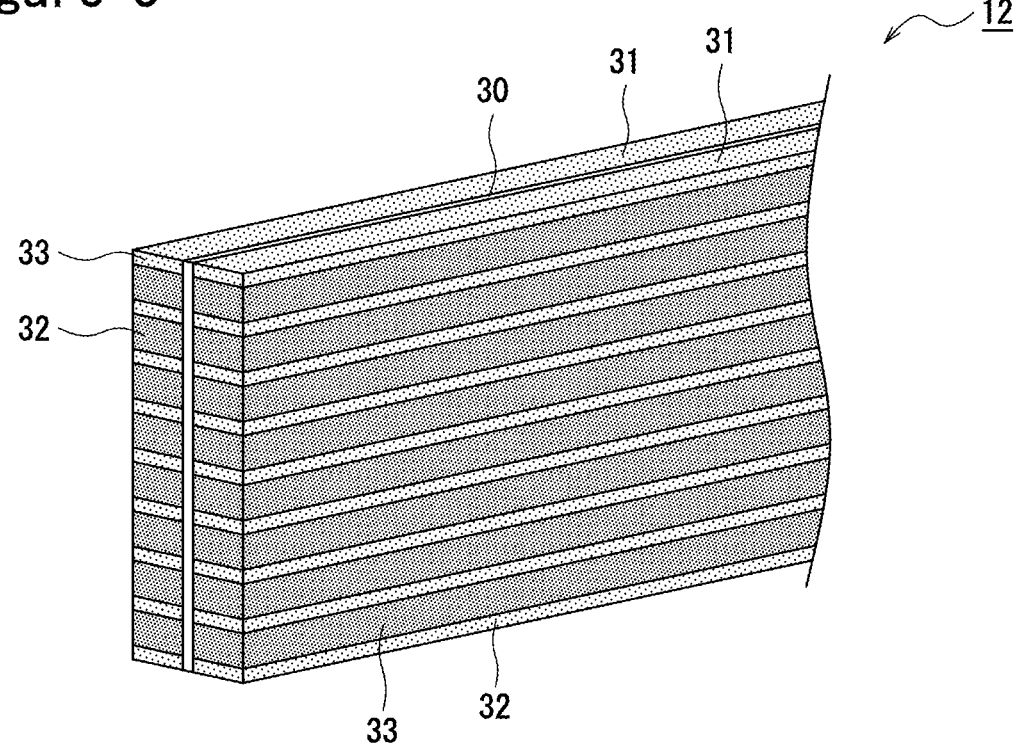
FIG. 3 is a perspective view of a negative electrode that is an example of another embodiment.

As illustrated in FIG. 2, the negative electrode 12 comprises a negative electrode mixture layer 31 that includes a plurality of high density regions 32 and a plurality of low density regions 33. The high density regions 32 and the low density regions 33 are alternately arranged in the first direction of the negative electrode mixture layer 31, extend in the second direction perpendicular to the first direction, and are formed in a stripe shape. Moreover, the high density region 32 and the low density region 33 are preferably formed in the same pattern in each negative electrode mixture layer 31 formed on both sides of the negative electrode core 30.

In the present embodiment, the first direction of the negative electrode mixture layer 31 corresponds to the width direction of the negative electrode 12, and the second direction of the negative electrode mixture layer 31 corresponds to the longitudinal direction of the negative electrode 12. The negative electrode 12 is wound so that the width direction thereof is along the axial direction of the electrode assembly 14, it means that the high density regions 32 and the low density regions 33 are alternately arranged in the axial direction of the electrode assembly 14, extend in the circumferential direction of the electrode assembly 14, and are formed in a stripe shape.

The high density region 32 is a region of higher density than the average value of the densities of the negative electrode mixture layers 31, and has a density of, for example, $1.60 \text{ g/cm}^3$ or higher. The high density region 32 contributes to a high capacity of a battery. The density of the high density region 32 is preferably $1.63 \text{ g/cm}^3$ or higher and more preferably $1.65 \text{ g/cm}^3$ or higher. The upper limit of the density of the high density region 32 is, for example, $1.80 \text{ g/cm}^3$ from the viewpoint of permeability of the electrolyte solution, etc.

The low density region 33 is a region of lower density than an average value of the densities of the negative electrode mixture layers 31, and has a density of, for example, less than $1.60 \text{ g/cm}^3$. The low density region 33 improves the cycle characteristics of the battery by increasing the permeability of the electrolyte solution, thereby contributing to a longer service life. The density of the low density region 33 is preferably $1.57 \text{ g/cm}^3$ or lower and more preferably $1.55 \text{ g/cm}^3$ or lower. The lower limit of the density of the low density region 33 is, for example, $1.40 \text{ g/cm}^3$ from the viewpoint of battery capacity, etc.

A density $\rho_{33}$ of the low density region 33 and a density $\rho_{32}$ of the high density region 32 preferably satisfy $0.75 \leq (\rho_{33}/\rho_{32}) < 1.0$ and more preferably $0.85 \leq (\rho_{33}/\rho_{32}) < 0.95$. By forming a plurality of high density regions 32 and a plurality of low density regions 33 in stripe shape in the negative electrode mixture layer 31, the permeability of the electrolyte solution to the electrode assembly 14 can be improved while ensuring a high capacity.

The densities in the plurality of high density regions 32 are substantially the same. Similarly, the densities in the plurality of low density regions 33 are substantially the same. As discussed below, when forming a plurality of high density regions 32 simultaneously by using the same mixture slurry, the density in each high density region 32 is essentially the same (the same applies to the density in each low density region 33). In the negative electrode mixture layer 31, three or more regions of different densities from each other may be formed in a stripe shape. In this case, the densities of all the regions formed in a stripe shape may differ from each other. When two or more regions having densities higher than the average density of the negative electrode mixture layer 31 are formed adjacent to each other, they form one high density region 32. The density in the high density region 32 may not be uniform. Similarly, when two or more regions having densities lower than the average density of the negative electrode mixture layer 31 are formed adjacent to each other, they form one low density region 33. The density in the low density region 33 may not be uniform.

The density of the negative electrode mixture layer 31 can be calculated from a mass of the negative electrode mixture layer 31 obtained by subtracting a mass of the negative electrode core 30 from a mass of the negative electrode 12 in a predetermined area, and a volume of the negative electrode mixture layer 31 obtained by multiplying a thickness of the negative electrode mixture layer 31 by the predetermined area (the same applies to the density of the positive electrode mixture layer). It is noted that the average value of the density of the negative electrode mixture layer can be calculated by weighting the density $\rho_{32}$ of the high density region 32 and the density $\rho_{33}$ of the low density region 33 by the respective volumes thereof and weighted averaging them. The thickness of the negative electrode mixture layer 31 is, for example, approximately constant throughout the entire layer including the high density regions 32 and the low density regions 33, and is 50 μm to 120 μm on one side of the negative electrode core 30.

The negative electrode mixture layer 31 includes the plurality of high density regions 32 and the plurality of low density regions 33, and when the high density region 32 and the low density region 33 that are adjacent to each other are regarded as one pattern, the number of patterns results in at least 2. If the number of patterns is one, it would be difficult to spread the electrolyte solution evenly throughout the entire electrode assembly 14, thereby an effect of improving cycle characteristics cannot be achieved.

The respective numbers of the high density regions 32 and the low density regions 33 is preferably three or more. In other words, the number of patterns consisting of pairs of the high density regions 32 and the low density regions 33 is preferably three or more and particularly preferably four or more. In this case, the effect of improving the cycle characteristics becomes more pronounced. In the example shown in FIG. 2, four each of the high density regions 32 and the low density regions 33 are alternately arranged, and four patterns are formed. From the viewpoint of cycle characteristics, the upper limit of the number of patterns not particularly limited, and considering the productivity, 10 or less thereof are preferred. Examples of a suitable range of the number of patterns are 3 to 8, 4 to 7, or 4 to 6.

In the example shown in FIG. 2, the widths of the high density region 32 and low density region 33 are substantially the same, and each region is formed in band shape with a constant width along the longitudinal direction. Moreover, the low density region 33 is formed along one end of the negative electrode mixture layer 31 in the width direction, and the high density region 32 is formed along the other end in the width direction. The density of the negative electrode mixture layer 31 along the longitudinal direction of the negative electrode 12 is substantially constant. The total width of the negative electrode mixture layer 31 is not particularly limited, and one example thereof is 20 mm to 200 mm. The high density region 32 and the low density region 33 are formed throughout the entire regions of both sides of the negative electrode core 30 excluding an exposed portion to which the negative electrode lead 21 is connected.

The high density region 32 and the low density region 33 may be composed of the same materials as each other and may have the same compounding ratio of the constituent materials. In other words, the type of the negative electrode active material, the type of binder, and the compounding ratio included both in the high density region 32 and the low density region 33 are the same, and both of the regions may differ only in density, for example, due to filling states (particle gap) of active material particles different from each other. As will be described in detail below, by using two types of mixture slurries in which only the ratios of the solid content (amounts of solid content) to the dispersion medium are changed, it is possible to form two types of regions having different densities from each other.

The high density region 32 and the low density region 33 may be composed of different materials from each other. Alternatively, a density difference may be made between the regions by changing a compounding ratio of the constituent materials of each region. For example, the high density region 32 may include an active material with a small tap density and the low density region 33 may include an active material with a large tap density. Moreover, using an active material having a large particle size and an active material having a small particle size in the high density region 32 may enhance a filling property of the active material particles, thereby increasing the density. As the negative electrode active material, graphite and a Si-based active material may be combined for use in the high density region 32, and graphite may be used alone in the low density region 33.

As illustrated in FIG. 3, the widths of the high density region 32 and the low density region 33 may differ from each other. In the example shown in FIG. 3, the high density region 32 is formed wider than the low density region 33. This, for example, facilitates a higher capacity to be achieved while improving the permeability of the electrolyte solution to the electrode assembly 14. The plurality of high density regions 32 are formed with substantially the same width and so are the plurality of low density regions 33. The widths of each high density region 32 may differ from each other, and similarly, the widths of each low density region 33 may differ from each other. Further, the low density region 33 may be formed wider than the high density region 32.

As illustrated in FIG. 3, the low density regions 33 having favorable permeability of the electrolyte solution may be formed along both ends of the negative electrode mixture layer 31 in the width direction. In the example shown in FIG. 3, the low density regions 33 the number of which is more by one than that of the high density regions 32 are formed. Also, the high density regions 32 the number of which is more by one than that of the low density regions 33 may be formed, and the high density regions 32 may be formed at both the ends of the negative electrode mixture layer 31 in the width direction.

Figure 4:
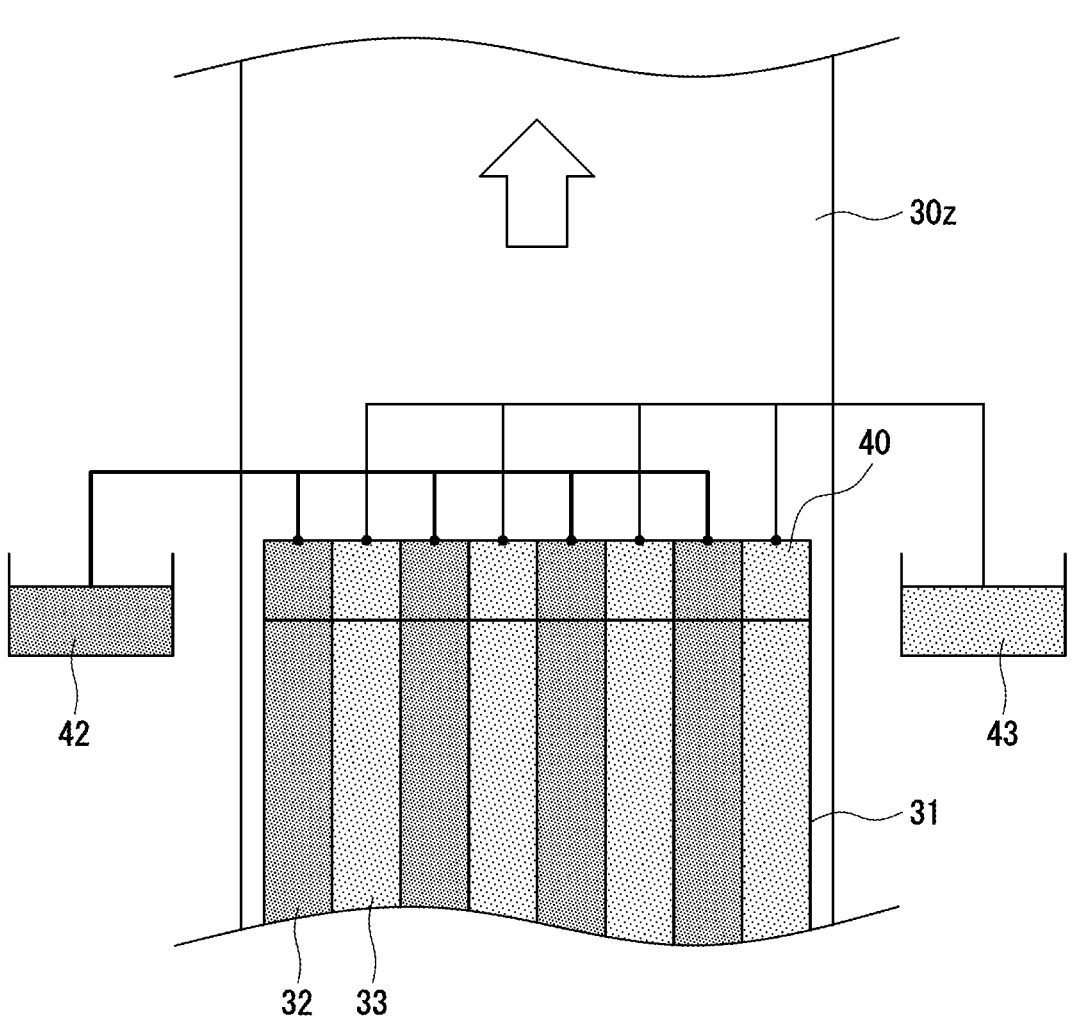
FIG. 4 is a view illustrating a method for producing an electrode that is an example of still another embodiment.

FIG. 4 is a view showing an example of a method for producing the negative electrode 12 comprising the aforementioned configuration. As illustrated in FIG. 4, by coating a long body 30z of the negative electrode core 30 with two types of the negative electrode mixture slurries 42, 43 by using a coating apparatus comprising a plurality of discharge sections 40, the negative electrode mixture layer 31 that includes the plurality of high density regions 32 and the plurality of low density regions 33, can be formed. The method of coating with the mixture slurry is not particularly limited and can be either a transfer method or a direct method, but the direct method is preferred in order to cleanly form each region without mixing.

In the example shop in FIG. 4, the plurality of discharge sections 40 connected to a supply source of the negative electrode mixture slurry 42 and the plurality of discharge sections 40 connected to a supply source of the negative electrode mixture slurry 43, are arranged alternately along the width direction of the long body 30z. In this case, coated films of the negative electrode mixture slurries 42, 43 are formed alternately in the width direction of the long body 30z.

By drying the coated films of the negative electrode mixture slurries 42, 43 and compressing them with a rolling roller, followed by cutting the long body 30z into a predetermined electrode size, the negative electrode 12 in which the high density regions 32 and the low density regions 33 are formed in a stripe shape along the longitudinal direction of the negative electrode core 30, is obtained. For the negative electrode mixture slurries 42, 43, slurries that differ from each other in type of active material, type of binder, and compounding ratio of these materials, may be used, or slurries that differ from each other only in amount of solid content may also be used. When using two slurries that differ only in the amount of solid content, for example, a thickness of the coated film after drying is thicker when using the slurry with a higher amount of solid content, and thereby the film is compressed more firmly in the subsequent compression step. Therefore, the portion coated with the slurry with the higher amount of solid content becomes the high density region 32 and the portion coated with the shiny with the lower amount of solid content becomes the low density region 33.

As described above, the density pattern of the negative electrode mixture layer 31 can also be applied to the positive electrode mixture layer, so that the above description of the negative electrode mixture layer 31 can be replaced with the description of the positive electrode mixture layer. However, in the case of the positive electrode mixture layer, the density of the high density region 32 is preferably 3.63 $g/cm^3$ or higher and more preferably 3.65 $g/cm^3$ or higher. Moreover, the density of the low density region 33 is preferably 3.57 $g/cm^3$ or lower and more preferably 3.55 $g/cm^3$ or lower.

In order to improve the permeability of the electrolyte solution to the electrode assembly 14 and to improve the cycle characteristics of the battery, a density pattern in which a plurality of high density regions and a plurality of low density regions are formed in a stripe shape, may be applied to at least one of the positive electrode mixture layer and the negative electrode mixture layer 31. In particular, the density pattern is preferably applied to the negative electrode mixture layer 31, which has a large volume change due to charge and discharge.

EXAMPLES

Hereinafter, the present disclosure will be further described with reference to Examples, but the present disclosure is not limited to these Examples.

Example 1

[Preparation of Positive Electrode]

As the positive electrode active material, lithium-nickel composite oxide containing aluminum and cobalt was used. The positive electrode active material, acetylene black, and polyvinylidene difluoride were mixed at a predetermined solid content mass ratio, and N-methyl-2-pyrrolidone (NMP) was used as a dispersion medium to prepare a positive electrode mixture slurry. Next, both sides of a positive electrode core made of aluminum foil were coated with this positive electrode mixture slurry, and the coated film was dried and compressed, and then cut into a predetermined electrode size to obtain a positive electrode in which positive electrode mixture layers were formed on both sides of the positive electrode core.

[Preparation of Negative Electrode Mixture Slurry]

As the negative electrode active material, graphite powder and $SiO_x$ (x=0.97) were mixed at a mass ratio of 95:5, and used. Graphite powder, styrene-butadiene rubber, and carboxymethylcellulose were mixed at a solid content mass ratio of 98:1:1, and water was used as the dispersion medium to prepare a negative electrode mixture slurry A in an amount of solid content of 60% by mass. Moreover, a negative electrode mixture slurry B in an amount of solid content of 40% by mass was also prepared by using the same raw materials.

[Fabrication of Negative Electrode]

Using the coating apparatus shown in FIG. 4, a negative electrode core made of copper foil was coated with these negative electrode mixture slurries A and B in a stripe shape along the longitudinal direction of the negative electrode core. The coated films of the negative electrode mixture slurries A and B are alternately arranged in the width direction of the negative electrode core and formed on both sides of the negative electrode core. After drying and compressing the coated films, they were cut into a predetermined electrode size to obtain a negative electrode having negative electrode mixture layers formed on both sides of the negative electrode core.

The density of the negative electrode mixture layer was 1.70 $g/cm^2$ for the portion coated with the negative electrode mixture slurry A (high density region), and was 1.50 $g/cm^2$ for the portion coated with the negative electrode mixture slurry B (low density region). In the negative electrode mixture layer of Example 1, the number of patterns was set to 4 when the high density region and the low density region adjacent to each other were defined as one pattern. Each region was set to have the same width.

[Preparation of Non-Aqueous Electrolyte Solution]

To a mixed solvent of ethylene carbonate (EC) and dimethyl carbonate (DMC) mixed in a volume ratio of 3:7 was dissolved $LiPF_6$ to a concentration of 1.3 mol/L to prepare a non-aqueous electrolyte solution.

[Fabrication of Secondary Battery]

After attaching an aluminum positive electrode lead to the positive electrode described above and a nickel negative electrode lead to the negative electrode described above, the positive electrode and the negative electrode were spirally wound with a separator interposed therebetween to obtain a wound electrode assembly. The negative electrode is wound so that the high density regions and the low density regions extend along the circumferential direction of the electrode assembly. This electrode assembly was housed in a bottomed cylindrical outer can, and after injecting the aforementioned non-aqueous electrolyte solution by a depressurization method, the opening of the outer body was sealed to obtain a cylindrical non-aqueous electrolyte solution secondary battery.

Example 2

A negative electrode and a secondary battery were fabricated in the same manner as in Example 1 except that the aforementioned number of patterns was set to 3 in the fabrication of the negative electrode mixture layer.

Example 3

A negative electrode and a secondary battery were fabricated in the same manner as in Example 1 except that the number of patterns above was set to 2 in the fabrication of the negative electrode mixture layer.

Example 4

A negative electrode and a secondary battery were fabricated in the same manner as in Example 1 except that the number of patterns above was set to 5 in the fabrication of the negative electrode mixture layer.

11

Example 5

A negative electrode and a secondary battery were fabricated in the same manner as in Example 1 except that the number of patterns above was set to 10 in the fabrication of the negative electrode mixture layer.

Example 6

A negative electrode and a secondary battery were fabricated in the same manner as in Example 1 except that the amount of solid content of the negative electrode mixture slurry A was 57% by mass and the amount of solid content of the negative electrode mixture slurry B was 43% by mass in the fabrication of the negative electrode mixture layer.

Example 7

A negative electrode and a secondary battery were fabricated in the same manner as in Example 1 except that the amount of solid content of the negative electrode mixture slurry A was 53% by mass and the amount of solid content of the negative electrode mixture shiny B was 47% by mass in the fabrication of the negative electrode mixture laver.

Comparative Example 1

A negative electrode and a secondary battery were fabricated in the same manner as Example 1 except that one negative electrode mixture slurry having an amount of solid content of 50% by mass was used.

[Cycle Test]

Each of the batteries of Examples and Comparative Example was charged at a constant current of 0.3 C under a temperature environment of 25° C. until the battery voltage reached 4.2 V. Thereafter, the battery was discharged at a constant current of 0.5 C until the battery voltage fell down to 2.5 V. This charge/discharge cycle was repeated for 1000 cycles.

[Calculation of Capacity Retention]

For each of the batteries of Examples and Comparative Example, the discharge capacity at the first cycle and the discharge capacity at the 1000th cycle in the aforementioned cycle test were determined, and the capacity retention was calculated by the following formula.

Capacity Retention (%)=(Discharge Capacity at 1000th cycle÷Discharge Capacity at 1st cycle)× 100

TABLE 1

| | Mixture layer density (g/cm$^3$) | | | Capacity |
| | High density region | Low density region | Number of patterns | retention (%) |
|---|---|---|---|---|
| Example 1 | 1.7 | 1.5 | 4 | 80 |
| Example 2 | 1.7 | 1.5 | 3 | 76 |
| Example 3 | 1.7 | 1.5 | 2 | 72 |
| Example 4 | 1.7 | 1.5 | 5 | 80 |
| Example 5 | 1.7 | 1.5 | 10 | 80 |
| Example 6 | 1.65 | 1.55 | 4 | 77 |
| Example 7 | 1.63 | 1.57 | 4 | 72 |
| Comparative Example 1 | 1.6 | | — | 70 |

As shown in Table 1, all of the batteries of Examples have higher capacity retention after the cycle test and superior cycle characteristics, compared to the battery of Comparative Example. The density difference between the high density region and the low density region of the negative electrode mixture layer of 0.1 g/cm$^3$ or more and the number of patterns of 3 or more provide particularly excellent cycle characteristics. In the case of the number of patterns set to 3 or more, the respective numbers of the high density regions and the low density regions are 3 or more.

REFERENCE SIGNS LIST

10 Secondary battery, 11 Positive electrode, 12 Negative electrode, 13 Separator, 14 Electrode assembly, 16 Outer can, 17 Sealing assembly, 18,19 Insulating plate, 20 Positive electrode lead, 21 Negative electrode lead, 22 Grooved portion, 23 Internal terminal plate, 24 Lower vent member, 25 Insulating member, 26 Upper vent member, 27 Cap, 28 Gasket, 30 Negative electrode core, 31 Negative electrode mixture layer, 32 High density region, 33 Low density region, 40 Discharge portion, 42, 43 Negative electrode mixture slurry

The invention claimed is:

1. A secondary battery, comprising:
an electrode assembly that includes:
at least a negative electrode that includes:
a core, wherein the electrode assembly is a wound electrode assembly in which the negative electrode for the secondary battery is spirally wound; and
a mixture layer formed on a surface of the core, wherein
the mixture layer includes high density regions and low density regions,
the high density regions and the low density regions are alternately arranged in a first direction of the mixture layer, extend in a second direction perpendicular to the first direction, and are formed in a stripe shape,
the first direction is perpendicular to a thickness direction of the core and along with an axial direction of the electrode assembly which is a width direction of the negative electrode,
each of the high density regions and the low density regions includes an active material and a binder, and
a density of each of the low density regions and a density of each of the high density regions satisfy
0.85≤ the density of each of the low density regions/the density of each of the high density regions <0.95;
an electrolyte solution; and
an outer body housing the electrode assembly.

2. The secondary battery according to claim 1, wherein respective numbers of the high density regions and the low density regions are three or more.

3. The secondary battery according to claim 2, wherein a width of each of the high density regions and a width of each of the low density regions in the first direction are equal to each other.

4. The secondary battery according to claim 2, wherein a width of each of the low density regions in the first direction is wider than a width of each of the high density regions in the first direction.

* * * * *